United States Patent
Naganathan et al.

(10) Patent No.: US 11,615,089 B1
(45) Date of Patent: *Mar. 28, 2023

(54) SYSTEM, METHOD, AND COMPUTER PROGRAM FOR CONVERTING A NATURAL LANGUAGE QUERY TO A STRUCTURED DATABASE QUERY

(71) Applicant: Apttus Corporation, San Mateo, CA (US)

(72) Inventors: Venkatraman Naganathan, San Jose, CA (US); Koti R. Nandyala, Fremont, CA (US)

(73) Assignee: Apttus Corporation, San Mateo, CA (US)

( * ) Notice: Subject to any disclaimer, the term of this patent is extended or adjusted under 35 U.S.C. 154(b) by 161 days.

This patent is subject to a terminal disclaimer.

(21) Appl. No.: 16/781,940

(22) Filed: Feb. 4, 2020

(51) Int. Cl.
*G06F 16/2453* (2019.01)
*G06F 16/242* (2019.01)

(52) U.S. Cl.
CPC ...... *G06F 16/24542* (2019.01); *G06F 16/243* (2019.01); *G06F 16/24537* (2019.01)

(58) Field of Classification Search
CPC ......... G06F 16/24542; G06F 16/24537; G06F 16/243
See application file for complete search history.

(56) References Cited

U.S. PATENT DOCUMENTS

| | | |
|---|---|---|
| 5,960,407 A | 9/1999 | Vivona |
| 6,473,084 B1 | 10/2002 | Phillips et al. |
| 7,328,177 B1 | 2/2008 | Lin-Hendel |
| 7,574,381 B1 | 8/2009 | Lin-Hendel |
| 7,725,358 B1 | 5/2010 | Brown et al. |

(Continued)

FOREIGN PATENT DOCUMENTS

| | | |
|---|---|---|
| CA | 2742395 | 1/2019 |
| CN | 1315705 | 3/2001 |

(Continued)

OTHER PUBLICATIONS

Oracle: Automating the Quote-to-Cash Process: An Oracle White Paper, Jun. 2009, pp. 1-19, 2009.

(Continued)

*Primary Examiner* — Aleksandr Kerzhner
*Assistant Examiner* — Aryan D Toughiry
(74) *Attorney, Agent, or Firm* — Lessani Law Group, PC

(57) ABSTRACT

The present disclosure describes a system, method, and computer program for converting a natural language query to a structured database query. In response to receiving a natural language query for a database, an NLU model is applied to the query to identify an intent and entities associated with the query. The intent is mapped to a database object, and candidate query fields and operands are identified from the entities. The candidate query fields and operands are evaluated to identify any subject fields, conditional expressions, record count limit, and ordering/sorting criteria for the query. This including matching certain query fields and operands based on query parameters, operand types, and locations of operands relative to query fields. A query plan is created based on the evaluation of the candidate query fields and operands, and a database query is generated from the query plan.

15 Claims, 7 Drawing Sheets

(56) References Cited

U.S. PATENT DOCUMENTS

| | | |
|---|---|---|
| 8,498,954 B2 | 7/2013 | Malov et al. |
| 8,644,842 B2 | 2/2014 | Arrasvuori et al. |
| 9,519,907 B2 | 12/2016 | Carter, III et al. |
| 10,289,261 B2 | 5/2019 | Aggarwal et al. |
| 10,521,491 B2 | 12/2019 | Krappe et al. |
| 10,621,640 B2 | 4/2020 | Krappe et al. |
| 10,783,575 B1 | 9/2020 | Krappe et al. |
| 11,232,508 B2 | 1/2022 | Krappe |
| 11,455,373 B2 | 9/2022 | Krappe et al. |
| 2002/0040332 A1 | 4/2002 | Maari et al. |
| 2003/0033240 A1 | 2/2003 | Balson et al. |
| 2006/0100912 A1 | 5/2006 | Kumar et al. |
| 2006/0136470 A1 | 6/2006 | Dettinger et al. |
| 2007/0016536 A1 | 1/2007 | Mirlas et al. |
| 2007/0039209 A1 | 2/2007 | White et al. |
| 2007/0087756 A1 | 4/2007 | Hoffberg |
| 2007/0162373 A1 | 7/2007 | Kongtcheu |
| 2008/0046355 A1 | 2/2008 | Lo |
| 2008/0091551 A1 | 4/2008 | Olheiser et al. |
| 2009/0048937 A1 | 2/2009 | Contreras et al. |
| 2009/0222319 A1 | 9/2009 | Cao et al. |
| 2009/0234710 A1 | 9/2009 | Belgaied Hassine et al. |
| 2009/0299974 A1 | 12/2009 | Kataoka et al. |
| 2009/0327166 A1 | 12/2009 | Carter, III et al. |
| 2010/0179859 A1 | 7/2010 | Davis et al. |
| 2010/0262478 A1 | 10/2010 | Bamborough et al. |
| 2010/0306120 A1 | 12/2010 | Ciptawilangga |
| 2011/0246136 A1 | 10/2011 | Haratsch et al. |
| 2011/0246434 A1* | 10/2011 | Cheenath ............... G06F 16/955 707/703 |
| 2012/0173384 A1 | 7/2012 | Herrmann et al. |
| 2012/0221410 A1 | 8/2012 | Bennett et al. |
| 2012/0246035 A1 | 9/2012 | Cross et al. |
| 2012/0254092 A1 | 10/2012 | Malov et al. |
| 2012/0259801 A1 | 10/2012 | Ji et al. |
| 2013/0103391 A1 | 4/2013 | Millmore et al. |
| 2013/0132273 A1 | 5/2013 | Stiege et al. |
| 2014/0025529 A1 | 1/2014 | Honeycutt et al. |
| 2014/0136443 A1 | 5/2014 | Kinsey, II et al. |
| 2014/0149273 A1 | 5/2014 | Angell et al. |
| 2015/0120526 A1 | 4/2015 | Peterffy et al. |
| 2015/0142704 A1 | 5/2015 | London |
| 2015/0309705 A1 | 10/2015 | Keeler et al. |
| 2015/0348551 A1 | 12/2015 | Gruber et al. |
| 2015/0378156 A1 | 12/2015 | Kuehne |
| 2016/0034923 A1 | 2/2016 | Majumdar et al. |
| 2017/0004588 A1 | 1/2017 | Isaacson et al. |
| 2017/0068670 A1 | 3/2017 | Orr et al. |
| 2017/0124176 A1 | 5/2017 | Beznos et al. |
| 2017/0124655 A1 | 5/2017 | Crabtree et al. |
| 2017/0235732 A1* | 8/2017 | Williams ............... G06F 16/955 707/723 |
| 2017/0243107 A1 | 8/2017 | Jolley et al. |
| 2017/0351241 A1 | 12/2017 | Bowers et al. |
| 2017/0358024 A1 | 12/2017 | Mattingly et al. |
| 2018/0005208 A1 | 1/2018 | Aggarwal et al. |
| 2018/0096406 A1 | 4/2018 | Krappe et al. |
| 2018/0218032 A1 | 8/2018 | Wong et al. |
| 2018/0285595 A1 | 10/2018 | Jessen |
| 2018/0293640 A1 | 10/2018 | Krappe |
| 2018/0336247 A1* | 11/2018 | Ignatyev ........... G06F 16/24542 |
| 2018/0349324 A1 | 12/2018 | Krappe et al. |
| 2018/0349377 A1* | 12/2018 | Verma ................... G06N 5/022 |
| 2019/0258632 A1* | 8/2019 | Pal .................... G06F 16/24542 |
| 2019/0370388 A1 | 12/2019 | Li et al. |
| 2020/0057946 A1 | 2/2020 | Singaraju et al. |
| 2020/0065354 A1 | 2/2020 | Krappe et al. |
| 2021/0089587 A1* | 3/2021 | Gupta .................. G10L 15/063 |
| 2021/0090575 A1 | 3/2021 | Mahmood et al. |
| 2022/0148071 A1 | 5/2022 | Krappe |

FOREIGN PATENT DOCUMENTS

| | | |
|---|---|---|
| CN | 106910091 | 6/2017 |
| EP | 2650776 | 10/2013 |
| EP | 3073421 | 9/2016 |
| JP | 2001290977 | 10/2001 |
| JP | 2017146909 | 8/2017 |
| WO | 0052605 | 9/2000 |
| WO | 03003146 | 1/2003 |
| WO | 2015106353 | 7/2015 |

OTHER PUBLICATIONS

McCormick, M., "What is Quote to Cash?" Jan. 20, 2016, Blog, BlackCurve, pp. 1-8, 2016.

Microsoft/APTTUS: Ultimate Guide to Quote-To-Cash for Microsoft Customers, Web Archives, Oct. 1, 2015, pp. 1-28.

Morelli et al., "IBM SPSS Predictive Analytics: Optimizing Decisions at the point of impact", pp. 1-59, 2010.

Wainewright, Phil, "Salesforce, Microsoft quote-to-cash partner Apttus raises $88m", Sep. 29, 2016, pp. 1-7.

Wainewright, Phil, Apttus Applies Azure Machine Learning to Quote-to-Cash, Apr. 3, 2016, pp. 1-5.

Wireless News: Banglalink Keeps Mobile Subscribers Using Predictive Analytics with KXEN, Close-Up Media, Inc., pp. 1-2, Oct. 5, 2013.

Riggins, J., "Interview Quote-to-Cash Pioneers Apttus Links Leads to Revenue", May 21, 2014, pp. 1-7.

Xie, Qitao et al., "Chatbot Application on Cyrptocurrency", 2019 IEEE Conference on Computational Intelligence for Financial Engineering & Economics, pp. 1-8, 2019.

Spedicato, G., et al., Machine Learning Methods to Perform Pricing Optimization. A Comparison with Standard GLMs, Dec. 2018, pp. 1-21.

* cited by examiner

Evaluating Candidate Query Fields and Operands

EXAMPLE SYSTEM ARCHITECTURE

FIG. 6

SYSTEM, METHOD, AND COMPUTER PROGRAM FOR CONVERTING A NATURAL LANGUAGE QUERY TO A STRUCTURED DATABASE QUERY

BACKGROUND OF THE INVENTION

1. Field of the Invention

This invention relates generally to a natural language interface to a database system, and, more specifically, to converting a natural language query to a structured database query in a B2B environment.

2. Description of the Background Art

With the advent of natural language chatbots, such as SIRI and ALEXA, users are increasingly employing bots to complete routine tasks, such as playing music, checking the weather, etc. Natural language bots are typically used in the consumer space, and they are designed to work with search engines that perform searches based on natural language key words.

Natural language bots can also be useful in business-to-business (B2B) applications. However, B2B systems are driven by heavy-duty data that is powered by complex databases, and chatbots are not designed to interface with such databases. One cannot query such a database using natural language key words due to the variability, complexity, and inherent ambiguity in natural language utterances.

Accessing data in B2B database requires a highly-structured database query language, such as SQL. A typical database query will reference a database object (e.g., a database table), one or more subject fields corresponding to a database object, one or more conditions referencing database fields, and sort/order by criteria. There are no implicit fields, semantic ambiguity, or fuzzy terms in a database query (see description of implicit fields, semantic ambiguity, and fuzzy terms below).

The highly-structured and complex nature of database queries present a challenge for natural language bots. Natural language queries are relatively unstructured and highly variable. For example:

Terms that might correspond to database fields can appear anywhere in a natural language query and some may be referred to only implicitly. For example, in the request, "show me quotes over $20k from last year", the price and created date fields are not specified explicitly even though the $20k implicitly refers to the quoted price and "from last year" implicitly refers to the date the quote was created.

Keywords in a natural language query can have multiple meanings, depending on the context. For example, the word "created" could be used to refer to a person that created an object/file or a date on which the object/file was created.

Ambiguity is inherent in natural language, and the database field to which a term corresponds depends on context. For example, take the following two phrases:
"Show me agreements I created."
"Show me agreements I created last year."
"Show me agreements that were created last year."
Assume the database object for agreements has the fields "createdBy" and "createdDate." Then, in the first two phrases, the entity "created" should be mapped to the "createdBy" field, and in the last phrase the entity "created" should be mapped to the "createdDate" field.

There are many different ways to express the same request, including many variations in the way object names, operators, operands, and conditions may be expressed. For example, the following two phrases ask for the same thing:
"Show me the last 3 agreements over $200k from last year that I created in Q4 2020."
"Show me the most recent 3 agreements from 2020 that I created in the $4^{th}$ quarter with an account value greater than $200k."

Phrases may be fuzzy, such as "a couple of weeks ago," "in a few months," "around $200k," etc.

A natural language bot for a B2B application must be able to effectively translate a natural language query to a database query. Known natural language bots use rudimentary natural language processing to parse part of a sentence, which, when used as an interface to a B2B base, results in an incomplete translation of the natural language query to a database query. This leads to incorrect or suboptimal results.

Therefore, there is demand for a system that can effectively translate a natural language query to a database query in B2B applications.

SUMMARY OF THE DISCLOSURE

The present disclosure relates to a natural language system for querying a database in a B2B system. Specifically, the present disclosure describes a system, method, and computer program for converting a natural language query to a structured database query.

A computer system (i.e., a natural language bot) receives a user's natural language query for a B2B application. An NLU engine within the system applies an NLU model to the query to identify an intent and entities associated with the query. The NLU engine tags the entities with a type.

The system identifies a database object in a B2B database corresponding to the identified intent. The system also identifies candidate query fields and operands for the query based on the entities associated with the query.

The system evaluate the candidate query fields and operands to identify any subject fields, conditional expressions, record count limit, and ordering/sorting criteria for the query. The system creates a query plan with the results of such evaluation and then generates a database query based on the query plan.

To evaluate the candidate query fields and operands, the system obtains query parameters for the query. The query parameters include specifications for standard and object-specific fields, as well as default fields for operand types.

The system preprocesses or "cleans up" the candidate query fields and operands for further processing. In one embodiments, this comprises removing redundant, trivial, and subsumed candidate query fields and operands from the list of candidate fields and operands being evaluated.

The system then determines if any of the candidate query fields are subject fields based on whether there are any queryable fields between the object name and an interrogative (e.g., "when," "who," "what") or lookup action entity (e.g., "tell me").

The system matches any candidate query fields that are not subject fields to operands based on the query parameters, operands types, and the location of operands relative to the candidate query fields. Any remaining operands are matched to default fields based on the default fields for the operands specified in the query parameters. The system adds the matched operands and query fields to query plan as parameters for a conditional expression. If the user query does not include explicit order or sorting criteria, the system determines whether to add any implicit ordering or sorting criteria to the query plan.

BRIEF DESCRIPTION OF THE DRAWINGS

FIG. 6 is a screen shot that illustrates an example of queries used to train an NLU model to identify a "lookup-Quote" intent.

DETAILED DESCRIPTION OF THE PREFERRED EMBODIMENTS

The present disclosure relates to a natural language system for querying a database in a B2B system. Specifically, the present disclosure describes a system, method, and computer program for converting a natural language query to a structured database query. A structured database query is a query that requires specific syntax and delineates the database object, subject fields of the query, and any conditional parameters. A SQL query is an example of a structured database query. The method is performed by a computer system.

1. OVERVIEW

Figure 1:
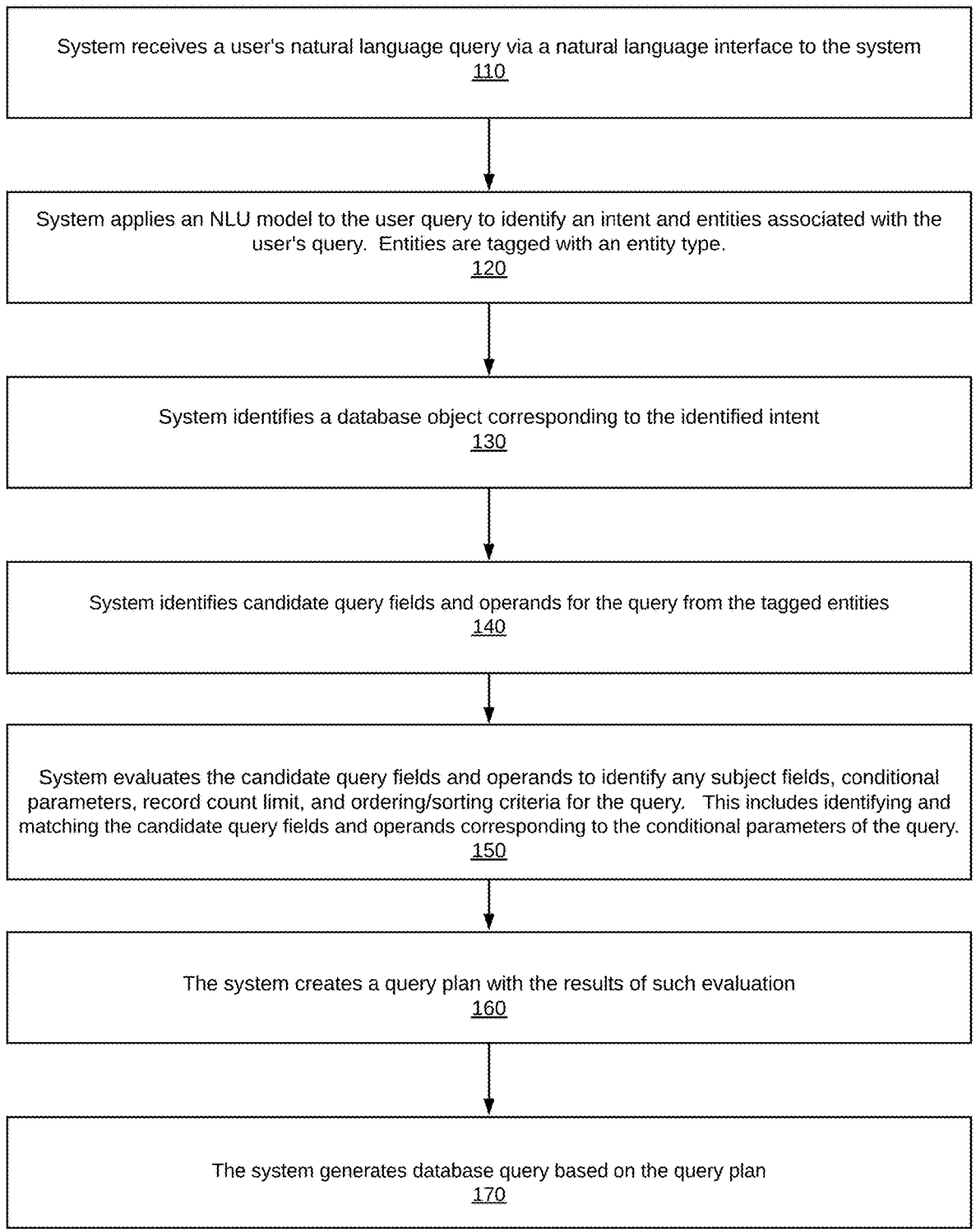
FIG. 1 is a flowchart that illustrates a method, according to one embodiment, for converting a natural language query into a structured database query.

FIG. 1 illustrates an overview of the steps for converting a natural language query into a structured database query. The system provides a natural language interface to a B2B application and receives a natural language query from a user for the B2B application (step 110). The natural language interface may be a text interface, a voice interface, an email interface, and/or any other interface in which a natural language query may be inputted into the system (e.g., any interface provided via an Internet-enabled device, such as desktop computer, laptop, mobile computing device, or embedded devices, etc.). For example, the user may text the system via a messaging interface or speak to the system via a voice interface. From the user perspective, the natural language interface appears as a bot or virtual agent that can be queried.

A natural language understanding (NLU) engine within the system applies an NLU model to the query to identify an intent and entities associated with the query (step 120). An NLU model is a set of rules and training data aimed to teach the NLU engine how to classify an incoming user utterance with respect to an intent and entities.

The intent is the action the NLU engine predicts that the user wants to take, for example, to look up a quote or retrieve certain agreements. The NLU model is trained to identify intents based on training queries labeled as corresponding to an intent. FIG. 6 is a screenshot that illustrate an example of queries used to train an NLU model to identify a "lookup-Quote" intent. The intent corresponds to a database object (e.g., a database table). In this example, "Quote" is a database object.

The entities correspond to the parameters of the query. For each entity, the NLU engine outputs a standardized value for the entity and an entity type. The NLU model is trained to map various words and phrases in a natural language query to standardized values for entities. For example, the NLU may be trained to map the words "total value," "value," "amounts," "worth," "net worth," and "annual worth" to the entity value "amount."

Training phrases and words labeled with an entity type are used to train the NLU model to recognize entity types. The entity type associated with an entity allows the system to determine whether the entity is a query field or operand and whether the entity requires further processing for purposes of determining how to handle the entity in a structured database query. In one embodiment, there are entity type tags for the following:

Object Name: Entities that correspond to a database object such as "agreements" or "quotes" are tagged as an object name.

Standard fields.
  Standard fields are queryable database fields that are common across a number of database objects. For example, in a business database with agreements and quotes, standard fields may include fields that specify the start date (e.g., "startDate"), the close date (e.g., "closeDate"), and the expiration date (e.g., "validUntilDate"), etc. of an agreement or quote. Queryable database fields are database fields that can be queried.

Object-Specific fields
  Object-specific fields are queryable database fields specific to a particular database object.

Filter Modifiers.
  Filter modifiers are entities that alter the count or order of the query results. For examples, these may include terms such as "last," "first," "full," "ascending," "descending," and "reverse."

Filter Operations
  Entities that are Boolean, comparison, and order by operators are labeled as a filter operation. Examples include "range," "greater," "lesser," "equal," "and," "or" "not," and "order by."

Date, time, and currency entities.
  Entities that related to a date, a date range, and currency are tagged accordingly.

Record Count
  A record count entity is a contextual entity that identifies how many records should be returned.

Object-Specific Contextual entities
  An object-specific contextual entity is an object-specific operand for which the corresponding queryable field can be determined by the NLU model from the context of the query. For example, in the query "show me the Acme quote that I created last month," the entity "Acme" would be understood to be the value for a record name field the quote object. Object name, account name, etc. are example of object-specific contextual entities.

Interrogatives: Words such as "who," "what," and "when" are tagged as interrogatives. As discussed in more detail below, interrogatives enable the system to identify subject fields for a query.

Lookup Action: Phrases that indicate a request to lookup data, such as "tell me" and "show me," are lookup actions.

The table below illustrates an example of the tagged entity types and values for the phrase "Who created the top 3 Acme quotes from last year that are over $20k that expire in the next 24 months and when?" in a B2B application that enables users to create quotes and agreements. This query is referred to herein as "the example query." The intent associated with the example query is to look up a quote (e.g., "lookupQuote").

TABLE 1

NLU Entities

| Phrase | Type | Value | StartIndex | EndIndex |
|---|---|---|---|---|
| Who | interrogative | Who | 0 | 2 |
| Created | standardField | createdDate OrCreatedBy | 4 | 10 |
| Top | filterModifier | Top | 16 | 18 |
| 3 | recordCount | 3 | 20 | 20 |
| Acme | recordName | Acme | 22 | 24 |
| Quotes | objectName | Quote | 26 | 31 |
| from last year | builtin.datetimeV2.daterange | [object Object] | 33 | 46 |
| From | filterOperation | Range | 33 | 36 |
| Last | filterModifier | Last | 38 | 41 |
| Over | filterOperation | Greater | 57 | 60 |
| $20k | builtin.currency | 20000 | 62 | 65 |
| Expire | agreementStatus | endDate | 72 | 77 |
| Expire | quoteField | validUntilDate | 72 | 77 |
| in the next 24 months | builtin.datetimeV2.daterange | 2019 Oct. 20 to 2021 Oct. 20 | 79 | 99 |
| When | interrogative | When | 105 | 108 |

The system identifies the database object being queried based on the intent with which the query was labeled by the NLU engine (step 130). For example, if the NLU engine determines that the intent for the phrase, "show me last 3 agreements over $200k from last year that I created ending in Q4 2020," is "lookup Agreement," then the system determines that "Agreement" is the database object. Likewise, if the NLU determines that the intent for the phrase "Who created the top 3 Acme quotes from last year that are over $20k that expire in the next 24 months and when?" is "lookup Quote," then the system determines that "Quote" is the database object.

As state above, each entity identified by the NLU engine is tagged with an entity type. The system identifies candidate query fields and operands for further processing based on an entity's type tag (step 140). Standard fields, object-specific fields, and filter modifiers are categorized as candidate query fields. Filter operation and date/time/currency entities are categorized as candidate operands. In certain embodiments, entities tagged with record count or an object-specific contextual entities are treated as operands for purposes of step 140. In other embodiments, the system disregards contextual entities as this stage and adds them to the query plan at a later stage (e.g., as part of step 160)

The tables below illustrates an example of how the system would identify candidate query fields and operands from the tagged entities in Table 1:

Candidate Query Fields

TABLE 2a

| Phrase | Type | Value | StartIndex | EndIndex |
|---|---|---|---|---|
| Created | standardField | Createdby OR createdDate | 4 | 10 |
| Top | filterModifier | Top | 16 | 18 |

TABLE 2a-continued

| Phrase | Type | Value | StartIndex | EndIndex |
|---|---|---|---|---|
| Last | filterModifier | Last | 38 | 41 |
| Expire | quoteField | validUntilDate | 72 | 77 |

Candidate Operands

TABLE 2b

| Phrase | Type | Value | StartIndex | EndIndex |
|---|---|---|---|---|
| 3 | recordCount | 3 | 20 | 20 |
| From | filterOperation | From | 33 | 36 |
| Over | filterOperation | Greater | 57 | 60 |
| From last year | Builtin.datetimeV2.daterange | 2018 Jan. 1 to 2018 Dec. 31 | 33 | 46 |
| In the next 24 months | Builtin.datetimeV2.daterange | 2019 Oct. 20 to 2021 Oct. 20 | 79 | 99 |
| $20k | Builtin.currency | $20k | 62 | 65 |

In Table 2a, the candidate query fields are the entities from Table 1 that are tagged as a standard field ("created"), an object-specific field ("expire"), or a filter modifier ("top" and "last"). In Table 3a above, the operands are the entities from Table 1 that are tagged as filter operations ("from," "over"), currency ("$20k"), or a date range ("from last year," "in the next 24 months"). In addition, the entity "3" is a contextual entity (i.e., record count) that the system treats as an operand in this example embodiment.

The system evaluates the candidate query fields and operands to identify any subject fields, conditional parameters, record count limit, and ordering/sorting criteria for the query (step 150). This includes identifying and matching the query fields and operands corresponding to the conditional parameters of the query. This step is described in more details with respect to FIG. 2.

The system creates a query plan with the results of such evaluation (step 160). Any contextual entities not processed in step 150 are added to the conditional parameters of the query plan. The system then creates a database query based on the query plan (step 170). In creating the database query, the system maps query fields to actual database fields using a simple mapping of query field values to database fields. For each query field in the query plan, it then creates the applicable expression/statement within the database query using the applicable database field and the corresponding operand and operator associated with the query field. For each query field corresponding to a conditional expression, the system creates a simple condition for the database query using the mapped database field and corresponding operator and operand. All the simple conditions are combined for the actual conditional expression in the database query (e.g., all the where clause conditions are ANDed with each other to form an actual WHERE clause).

2. EVALUATING CANDIDATE QUERY FIELDS AND OPERANDS

Figure 2:
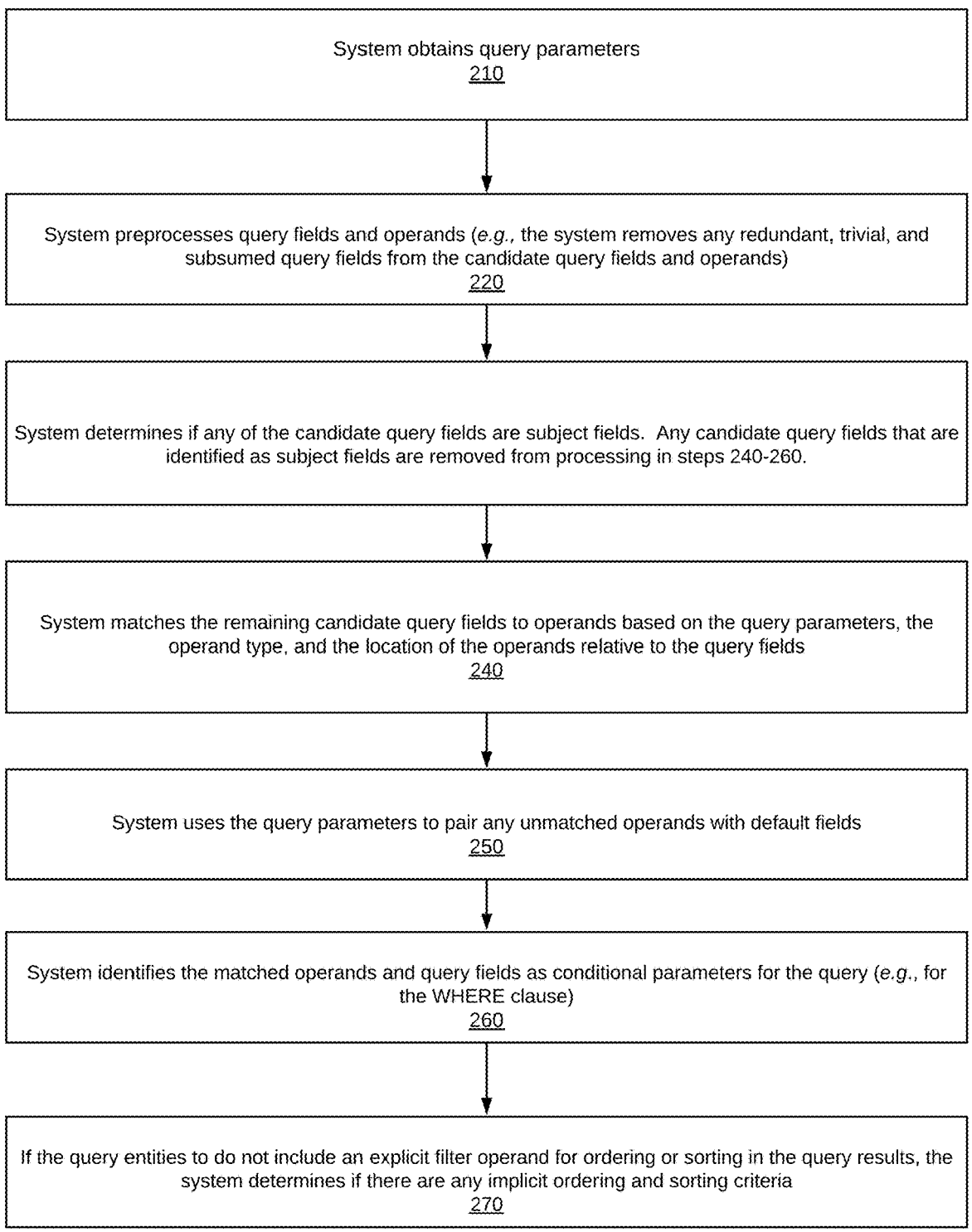
FIG. 2 is a flowchart that illustrates a method, according to one embodiment, for evaluating candidate query fields and operands to identify any subject fields, conditional parameters, and ordering/sorting criteria for the query.

FIG. 2 illustrates a method for evaluating candidate query fields and operands to identify any subject fields, conditional parameters, record count limit, and ordering/sorting criteria for the query.

If one operand is a superset of a query field, the system subsumes the smaller query field.

For example, in the example query above, the word "from" is subsumed by the phrase "from last year." The word "last" is also subsumed by the phrase "from last year." Therefore, the system remove "from" from the list of operands to be processed and "last" from the list of query fields to be processed. Therefore, for purposes of the example query, this leaves the following query fields and operands for further processing:

Candidate Query Fields

TABLE 3a

| Phrase | Type | Value | StartIndex | EndIndex |
|---|---|---|---|---|
| Created | standardField | created | 4 | 10 |
| Top | filterModifier | top | 16 | 18 |
| Expire | quoteField | validUntilDate | 72 | 77 |

Operands

TABLE 3b

| Phrase | Type | Value | StartIndex | EndIndex |
|---|---|---|---|---|
| 3 | recordCount | 3 | 20 | 20 |
| From last year | Builtin.datetimeV2.daterange | 2018 Jan. 1 to 2018 Dec. 31 | 33 | 46 |
| Over | filterOperation | Greater | 57 | 60 |
| $20k | builtin.number | $20k | 62 | 65 |
| In the next 24 months | Builtin.datetimeV2.daterange | 2019 Oct. 20 to 2021 Oct. 20 | 79 | 99 |

2.1 Obtaining Query Parameters

In order to know how to process the candidate query fields and operands, the system obtains query parameters, including object-specific query parameters (step 210). The query parameters include specifications for standard fields and object-specific fields, as well as default fields for operand types. The specifications for a standard or object-specific query field may include the operand type accepted by the query field, whether the query field is a default field for the operand type, any matching rules for the query field (e.g., "match only to operands to the right of the query field"), and whether the query field is ambiguous. For example, the query parameters would specify that the field "validUntilDate" takes a date operand.

An ambiguous query field is one in which the entity associated with the field can map to two or more fields. For example, the entity "created" could be associated with the "createdBy" field in a database or the "createdDate" field in the database, depending on whether the user is referring to a person or a date.

In one embodiment, the query parameters are determined by a developer of the system, and the system accesses the applicable query parameters from a list or library of query parameters. In one embodiment, query parameters are defined for each database object.

2.2 Preprocessing Fields and Operands

The system preprocesses or "cleans up" the candidate query fields and operands to prepare them for further processing (step 220). For example, the system may preprocess the fields and operands by removing any redundant, trivial, and subsumed query fields and operands from the candidate query fields and operands. In one embodiment, this comprises the following steps:

System sorts query fields and operands based on start index.

If one operand is a superset of another operand, the system subsume the smaller one.

2.3 Identify any Subject Fields of the Query Based on Interrogatives

The system determines if any of the candidate query fields are "subject fields" (step 230). Subject fields are fields from which values will be returned to the user. For example, in a SQL query the subject fields are the fields in a SELECT statement. In one embodiment, the system determines if any of the candidate query fields are subject fields based on whether there are any queryable fields between an interrogative or lookup action entity in the query. A method for identifying the fields that are the subject of the query are described in more detail below with respect to FIG. 4.

Figure 4:
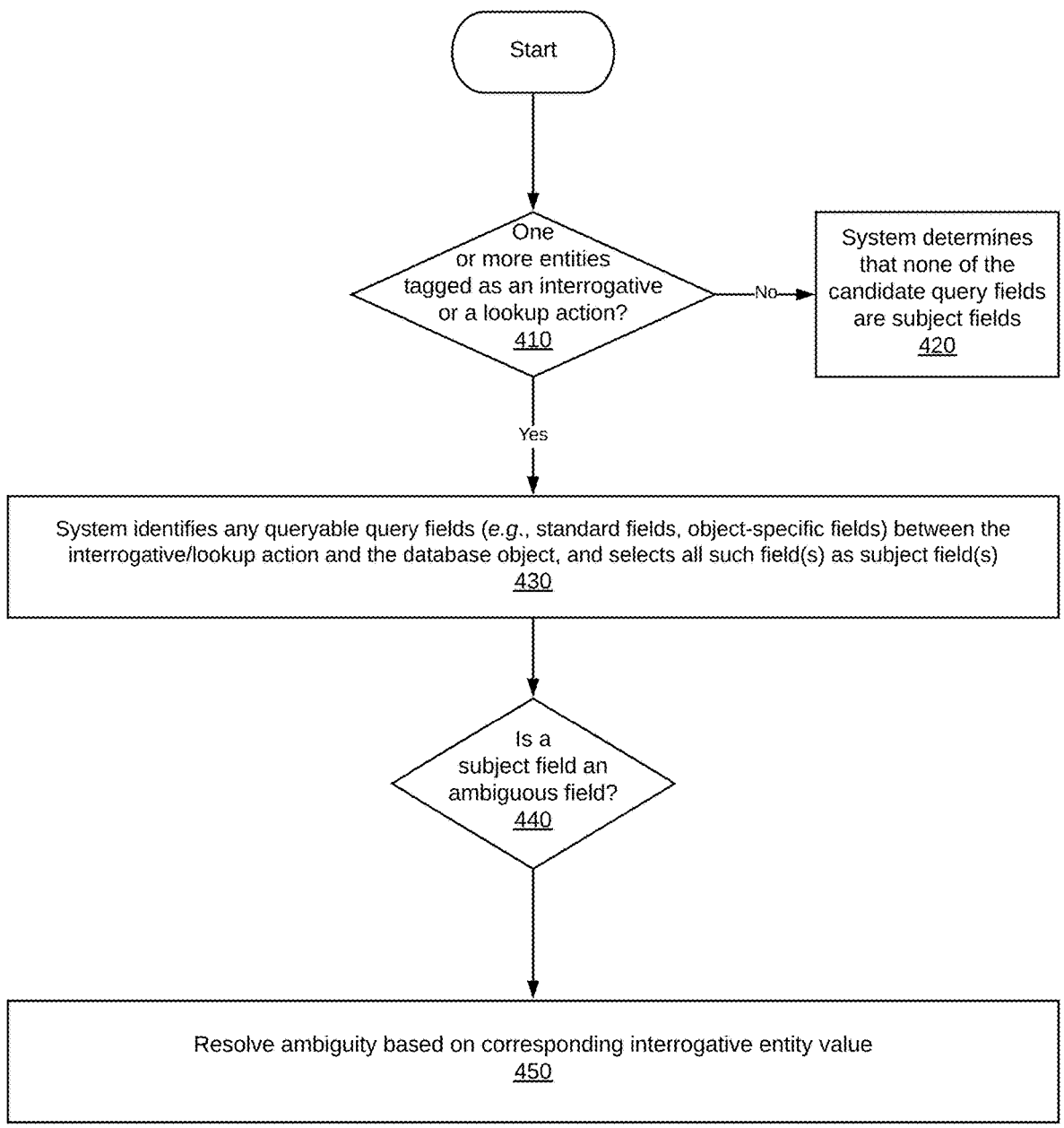
FIG. 4 is a flowchart that illustrates a method, according to one embodiment, for identifying which of the candidate query fields are the subject fields.

In the example query above, the system identifies both "createdBy" and "createdDate" as being subject fields due to the interrogatives "who" and "when" in the natural language query (see discussion related to FIG. 4). Consequently, the system adds the following subject fields to the query plan:

Subject Fields

TABLE 4

| Phrase | Type | Value | StartIndex | EndIndex |
|---|---|---|---|---|
| created | standardField | createdBy | 4 | 10 |
| created | standardField | createdDate | 4 | 10 |

For some user queries, subject query fields will not be identified at this stage and will not appear in the query plan, such as the case when the user is asking for instances of a database object. For instance, in the query, "show me the last 5 agreements I created," the user is asking the system for electronic copies of certain agreements. Therefore, among candidate query fields and operands for this query, there are no subject fields. Instead, the system inserts the applicable default subject field(s) when creating the database query from the query plan. In other words, if the user does not explicitly reference a subject field, the system retrieves a configure list of default field(s) based on the database object.

2.4 Matching Remaining Query Fields and Operands

At this point the database object and the subject fields (if any) have been identified. For a SQL query this means that the database object for the FROM statement and the database fields (if any) for the SELECT statement have been identified. Any remaining query fields and operands relate to other statements in a database query, such as a conditional expression (e.g., a WHERE statement), an ordering/sorting clause (e.g., an ORDERBY clause), and a limit on the number of records returned (e.g., a LIMIT statement).

In order to process the remaining query fields and operands for such clauses/statements, the system matches the remaining candidate query fields to operands based on the query parameters, the operand type of the operands (where the operand type of an operand is the entity type with which the operand is tagged by the NLU engine), and the location of the operands relative to the query fields (step 240). The query parameters are used to identify the operand type accepted by a query field, as well any specific matching rules pertaining to a query field or operand (e.g., certain fields may only match with operands appearing after the query field) An implementation of this step is described in more detail with respect to FIG. 3.

In the example query, the below candidate query fields are remaining after the subject fields have been removed:
Query Fields

TABLE 5

| Phrase | Type | Value | StartIndex | EndIndex |
|---|---|---|---|---|
| top | filterModifier | top | 16 | 18 |
| expire | quoteField | expire | 72 | 77 |

For the reasons set forth with respect to FIG. 3, the field "top" is matched to the operand "3," and the field "validUntilDate" is matched to the operand "in the next 24 months," as shown in the table below:
Matched Query Fields and Operands

TABLE 6

| Type | Value | Operator | Operand1 | Operand2 | Operand Description |
|---|---|---|---|---|---|
| filterModifier | Top | Equal | 3 | — | Record count |
| standardField | validUntilDate | Range | 2019 Oct. 20T07:00:00.000Z | 2021 Oct. 20T07:00:00.000Z | expire in the next 24 months |

This would leave the following operands unmatched after step 240:
Unmatched Operands

TABLE 7

| Phrase | Type | Value | StartIndex | EndIndex |
|---|---|---|---|---|
| From last year | Builtin.datetimeV2.daterange | 2018 Jan. 1 to 2018 Dec. 31 | 33 | 46 |
| Over | filterOperation | greater | 57 | 60 |
| $20k | builtin.number | $20k | 62 | 65 |

If any unmatched operands are remaining after step 240, than the fields corresponding to these operands in the user's query must be implicit. The query parameters specify default fields for operand types, and the system uses the query parameters to pair unmatched operands with default fields (step 250). Filter operation operands are associated with the closest following operand-query field pair and used to determine the operator associated with the pair. In the example query, the filter modifier "over" is used to apply the "greater than" operator to the match between "$20k" and "net price."

In the example user query, the unmatched operands in Table 7 would be matched as follow:
Default Field-Operand Matches

TABLE 8

| Query Field Type | Query Field Value | Operator | Matching Operand1 | Matching Operand2 | Operand Description |
|---|---|---|---|---|---|
| standardField | createdDate | Range | 2018 Jan. 1T07:00:00.000Z | 2018 Dec. 31T07:00:00.000Z | from last year |
| standardField | netPrice | Greater | 20000 | — | over $20k |

"CreatedDate" is the default query field corresponding to "from last year." "NetPrice" is the default query corresponding to "$20k."

The summary of the query field-operand matches from the example query are as follows:

All Query Field-Operand Matches

TABLE 9

| Query Field Type | Query Field Value | Operator | Matching Operand1 | Matching Operand2 | Operand Description |
|---|---|---|---|---|---|
| filterModifier | Top | Equal | 3 | — | Record count |
| standardField | validUntilDate | Range | 2019 Oct. 20T07:00:00.000Z | 2021 Oct. 20T07:00:00.000Z | expire in the next 24 months |
| standardField | createdDate | Range | 2018 Jan. 1T07:00:00.000Z | 2018 Dec. 31T07:00:00.000Z | from last year |
| standardField | netPrice | Greater | 20000 | | over $20k |

The system adds the matched operands and query fields to the query plan as conditional parameters for a query (e.g., for the WHERE clause) (step 260). In one embodiment, contextual entities are added to the conditional parameters of a query, even if they are not part of the matching process above. For example, "recordName=Acme" may be added to the conditional parameters for the example query in the query plan. The contextual entities may be added to the conditional parameters in making the query plan or in step 170 when the system generates a query based on the query plan.

The system associates certain filter modifiers, such as "top," or "last," with a record count limit, and adds the record count limit to the query plan. They may be paired with a default record count operand or an explicit record count contextual entity (e.g., "3" in the example above).

2.5 Identify any Implicit Sorting or Ordering Parameters for the Query

If the query entities to do not include an explicit filter operand for ordering or sorting in the query results, the system determines if there are any implicit ordering and sorting criteria (step 260). In one embodiment, this comprise the following:

The system determines if any of the query fields in the conditional expression take a date range. If so, the system adds an order by element to the query plan, specifying that results should be ordered based on the value of the query field. The system adapts the ordering results based on the query to ensure records that have immediate time significance are placed ahead of less-immediate records based on the nature of the query. For example, if a user asks for objects expiring next quarter, the results will be returned in ascending order based on expiration date, so that the first-to-expire object will be listed first. If the user asks for objects expiring last quarter, the results will be returned in descending order based on expiration date, so that the most recently expired object will be listed first.

The system determines if the query includes entities such as top, highest, lowest. etc. If so, the system specifies the matching query field (explicit or default) in the order by criteria.

The system adds any identified ordering/sorting criteria to the query plan.

2.6 Example Query Plan

Below is a summary of the query plan for the example query.

Query Plan

Intent

LookupQuote

Subject Fields

| Phrase | Type | Value | StartIndex | EndIndex |
|---|---|---|---|---|
| created | standardField | createdBy | 4 | 10 |
| created | standardField | createdDate | 4 | 10 |

Conditional Statement

| Query Field Type | Query Field Value | Operator | Matching Operand1 | Matching Operand2 | Operand Description |
|---|---|---|---|---|---|
| standardField | validUntilDate | range | 2019 Oct. 20T07:00:00.000Z | 2021 Oct. 20T07:00:00.000Z | expire in the next 24 months |
| standardField | createdDate | range | 2018 Jan. 1T07:00:00.000Z | 2018 Dec. 31T07:00:00.000Z | from last year |
| standardField | netPrice | greater | 20000 | — | over $20k |
| Contextual entity | recordName | equals | Acme | | Acme |

Sorting and Ordering sortBy netPrice

Record Count

3. EXAMPLE METHOD FOR MATCHING CANDIDATE QUERY FIELDS TO OPERANDS

Figure 3A:
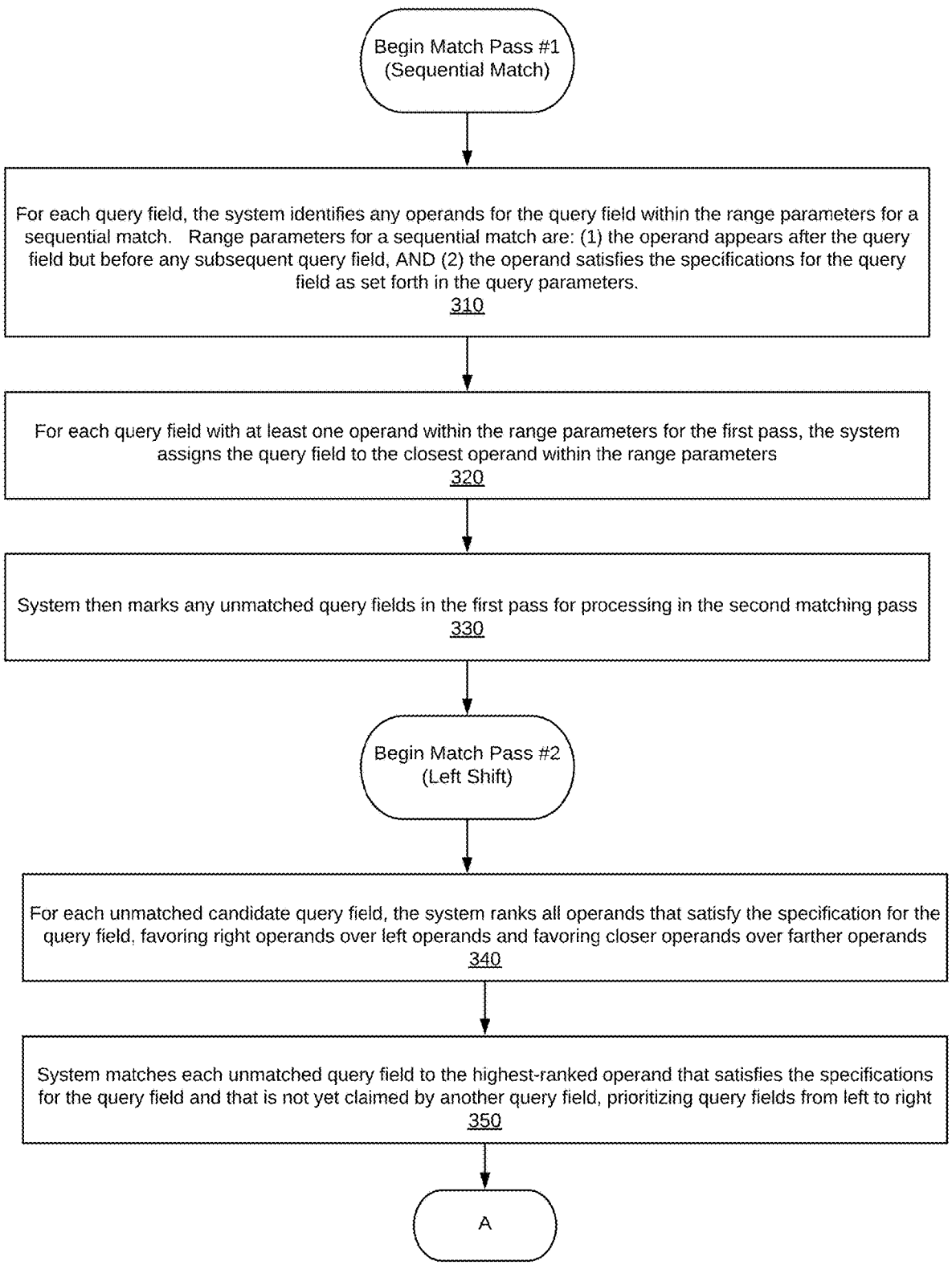
FIGS. 3A and 3B are flowcharts that illustrate a method, according to one embodiment, for matching candidate query fields to operands.
Figure 3B:
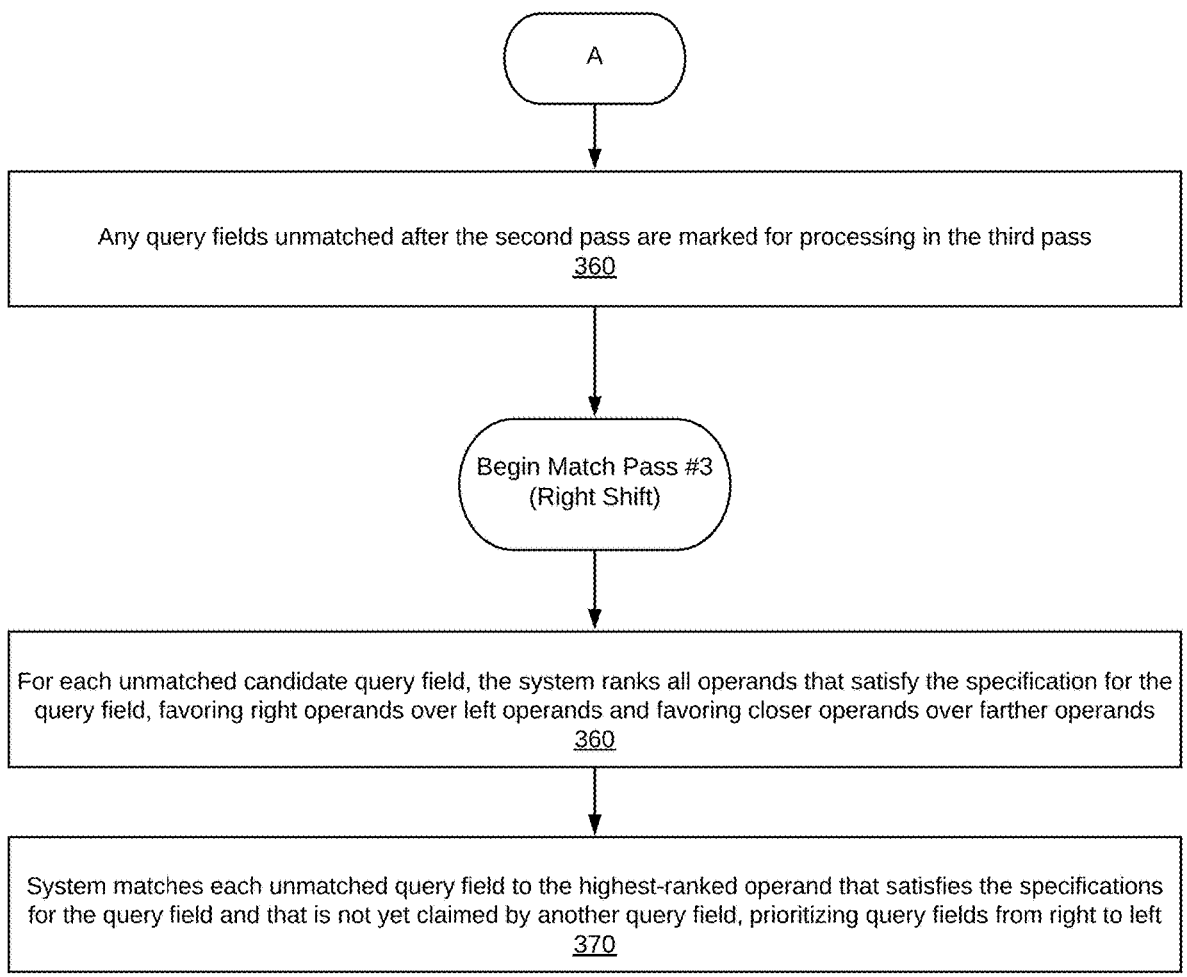

FIGS. 3A-3B illustrate an example method for matching candidate query fields to operands. This method includes three matching passes, referred to herein informally as "sequential match," "left pass," and "right pass."

3.1 Pass #1: Sequential Match

In matching query fields to operands, the most straight forward matches are when an operand of the correct type immediately follow a query field (e.g., "the top 3," or "expires in the next 24 months"). This is the idea behind the sequential match pass.

For each query field, the system identifies any operands for the query field within the range parameters for a sequential match (step 310). The range parameters for a sequential match are: (1) the operand appears after the query field but before any subsequent query field, AND (2) the operand satisfies the specifications for the query field as set forth in the query parameters. For example, the query parameters will specify the operand type accepted by the query field and may specify certain matching rules (e.g., "match only to operands after the query field").

For each query field with at least one operand within the range parameters for the first pass, the system assigns the query field to the closest operand within the range parameters (step 320). The system then marks any unmatched query fields in the first pass for processing in the second pass (step 325).

In the example query, the sequential match rules would result in the query fields "top" and "validUntilDate" being matched as follows:

| Type | Value | Operator | Operand1 | Operand2 | Desc | Comments |
|---|---|---|---|---|---|---|
| filterModifier | Top | Equal | 3 | — | | CORRECT match |
| standardField | validUntilDate | range | 2019 Oct. 20 T07:00:00.000Z | 2021 Oct. 20 T07:00:00.000Z | expire in the next 24 months | CORRECT match |

Since the system was able to match both remaining query fields in the first pass, the system would not need to proceed with the second and third passes in the case of the example query. However, there are many queries for which the second and third passes are applicable.

3.2 Pass #2: Left Shift

For each unmatched query field after the first pass, the system ranks all operands that satisfy the specification for the query field (step 330). In one embodiment, the system ranks the operands by running a typical sorting algorithm on the operands with a comparator comparing two operands at a time, wherein the comparator works as follows:
- If both operands being compared are to the right of the unmatched query field, rank the closer operand higher than the farther operand;
- If both operands being compared are to the left of the unmatched query field, rank the closer operand higher than the farther operand;
- If one operand is on the left and the other is in the right, rank the operand on the right higher if it is within a threshold number of characters to the query field. If the operand on the right is outside the threshold numbers of characters, rank the operand to the left higher if it is closer (else default to the right operand).

In this embodiment, an operand that is on the "left" of a query field, has a lower start index than the query field, and an operand that is on the "right" of a query field has a higher start index than the query field.

The system matches each unmatched query field to the highest-ranked operand that satisfies the specifications for the query field and that is not yet claimed by another query field, prioritizing query fields from left to right (i.e., prioritizing query fields by lowest start index) (step 340). Any query fields unmatched after the second pass are marked for processing in the third pass (step 350).

3.3 Pass #3: Right Shift

For each unmatched query field after the second pass, the system ranks all operands that satisfy the specification for the query field in accordance with the sorting algorithm described above (step 360).

The system matches each unmatched query field to the highest-ranked operand that satisfies the specifications for the query field and is not yet claimed by another query field, prioritizing query fields from right to left (step 370).

4. EXAMPLE METHOD FOR IDENTIFYING THE SUBJECT(S) OF THE QUERY

FIG. 4 illustrates a method, according to one embodiment, for identifying which of the candidate query fields are the subject fields. The system determines if any of the entities associated with the query are tagged as an interrogative or a lookup action (step 410). Examples of interrogatives are the words "who," "what," and "when." Examples of a lookup action are "show me" and "tell me." If there are no interrogatives or look up action entities in the user query, the system determines that there are none of the candidate query fields are subject fields (step 420).

If one or more of the entities are tagged as interrogatives or a lookup action, the system identifies any queryable query fields (e.g., standard fields, object-specific fields) between the interrogative/lookup action and an entity corresponding to the database object (e.g., an entity tagged "object name"), and selects all such field(s) as subject field(s) (step 430). If a subject field is an ambiguous field and there is an interrogative entity, the system resolves any ambiguities based on the value of the interrogative (steps 440, 450). For example, if the subject query field is "created," which may have the value createdBy or createdDate, and the interrogative before the subject query field is "who," the ambiguity will be resolved as "createdBy." Likewise, if the interrogative before the field is "when" the ambiguity will be resolved as "createdDate." In one embodiment, "what" is also resolved in favor of date fields. If there is a second interrogative after the database object (and there is no second database object), then the ambiguity will be resolved in favor of both ambiguous field values.

For instance, take the example query: "Who created the top 3 Acme quotes from last year that are over $20k that expire in the next 24 months and when?" As discussed above, the query has following candidate query fields:

| Phrase | Type | Value | StartIn. | EndIndex |
|---|---|---|---|---|
| Created | standardField | created | 4 | 10 |
| Top | filterModifier | top | 16 | 18 |
| Expire | quoteField | validuntilDate | 72 | 77 |

There are two interrogatives in the query, "who," and "when." "Created" and "top" are the two query fields between the interrogative "who" and the object "quotes." Since "created" is of type "standardField", which is a queryable field, the system identifies "created" as the subject field. "Top" is of the type "filterModifier," which is not a queryable field and, therefore, cannot be a subject field.

"Created" is an ambiguous field that can have value "createdBy" or "createdDate." Because of the interrogative "who," the system will resolve this ambiguity in favor or "createdBy." However, because there are no query fields or database objects after the interrogative "when," the system will assume that this interrogative also corresponds to "created" and also add "createdDate" as a subject field.

5. EXAMPLE SYSTEM ARCHITECTURE

Figure 5:
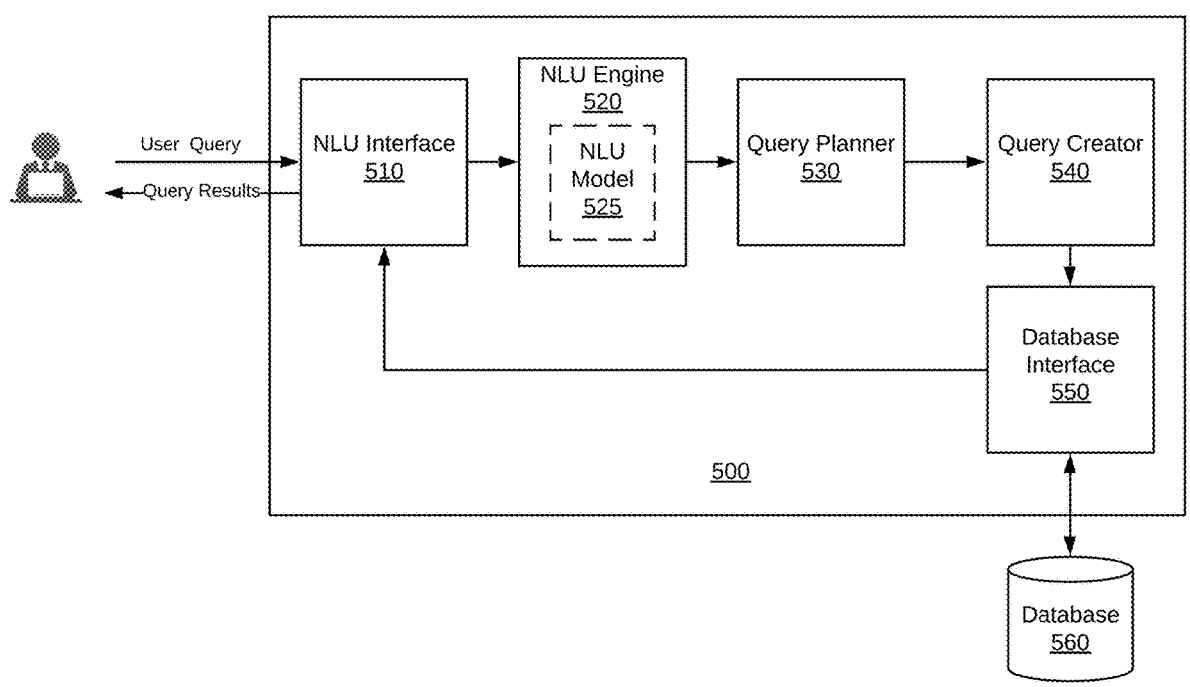
FIG. 5 is a block diagram that illustrates an example software architecture according to one embodiment.

FIG. 5 illustrates an example system architecture for performing the methods described herein. The methods described herein may be implemented in a system configured differently and are not limited to the system architecture illustrated in FIG. 5.

Example system 500 includes a NLU Interface 510, which enables a user to input a natural language query to the system. An NLU Engine 520 applies an NLU model 525 to a user's natural language query, and Query Planner Module 530 creates a query plan in accordance with the method of FIG. 2. Query Creation Module 540 creates a database query based on the query plan, and provides the database query to Database Interface 550 which serves as an interface to the queried database 560. Query results are return to the NLU Interface 510, which provides the query results to the user.

Those skilled in art will appreciate the system 500 may include additional modules, not relevant to the methods described herein, for providing B2B application functionality.

In one embodiment, system 500 is any system that is backed by or uses a database, such a customer relationship management (CRM) system or a quote-to-cash system. Quote-to-cash systems integrate and automate end-to-end sell-side processes, from creating a quote for a prospective customer to collecting revenue and managing renewals. For example, quote-to-cash systems facilitate sales transactions by enabling users to configure products, price products, generate quotes, provide product recommendations, create and sign contracts, manage billings, and perform other sell-side business functions. An example of a quote-to-cash system is the APTTUS quote-to-cash suite of products running on the SALESFORCE platform. In one embodiment, a quote-to-cash system is any system that performs at least one or more of the following business functions: (1) configure, price, and quote; (2) contract generation and management; (3) revenue management (e.g., billing and financial reporting); and (4) product recommendations (e.g., identifying upsell and cross sell opportunities) and other machine learning recommendations to optimize the sales process.

6. GENERAL

The methods described herein are embodied in software and performed by one or more computer systems (each comprising one or more computing devices) executing the software. A person skilled in the art would understand that a computer system has one or more memory units, disks, or other physical, computer-readable storage media for storing software instructions, as well as one or more processors for executing the software instructions.

As will be understood by those familiar with the art, the invention may be embodied in other specific forms without departing from the spirit or essential characteristics thereof. Accordingly, the above disclosure is intended to be illustrative, but not limiting, of the scope of the invention, which is set forth in the following claims.

The invention claimed is:

1. A method, performed by a computer system, for creating a database query from a user's natural language query, the method comprising:
receiving a user's natural language query via a natural language interface to the system;
applying a natural language model to the user's query to identify an intent and a plurality of entities associated with the user's query, wherein the entities are tagged with an entity type and associated with a normalized value;
identifying a database object corresponding to the identified intent;
identifying candidate query fields and operands for the query based on the entities and associated type tags;
creating a query plan for the query by evaluating the candidate query fields and operands to identify subject fields, conditional parameters, any record count limit, and any explicit or implicit ordering criteria for the query, wherein evaluating the candidate query fields and operands comprises:
obtaining query parameters,
determining if any of the candidate query fields are subject fields,
matching the candidate query fields that are not subject fields to operands based on the query parameters, entity tags associated with the operands, and locations of the operands relative to candidate query fields,
matching any operand not matched with a candidate query field to a default query field specified in the query parameters, and
adding the matched candidate queries and operands to the query plan as conditional parameters for the query,
wherein, in response to identifying implicit ordering criteria based on time, the computer system adapts ordering criteria based on the user's query to ensure results that have immediate time significance are placed ahead of less-immediate results; and
creating, based on the query plan, a database query, wherein the database query is in a database query language.

2. The method of claim 1, further comprising adding a record count limit and an ordering criteria to the query plan.

3. The method of claim 1, wherein the system identifies any queryable field located between an interrogative or a lookup action entity and an entity corresponding to the database object as a subject field.

4. The method of claim 1, wherein prior to determining if any of the candidate query fields are subject fields, the system preprocesses the candidate query fields and operands.

5. The method of claim 4, wherein preprocessing the operands and candidate query fields comprises removing any redundant, trivial, and subsumed query fields and operands from the candidate query fields and operands.

6. A non-transitory computer-readable medium comprising a computer program, that, when executed by a computer system, enables the computer system to perform the following method for creating a database query from a user's natural language query, the method comprising:
receiving a user's natural language query via a natural language interface to the system;
applying a natural language model to the user's query to identify an intent and a plurality of entities associated with the user's query, wherein the entities are tagged with an entity type and associated with a normalized value;
identifying a database object corresponding to the identified intent;
identifying candidate query fields and operands for the query based on the entities and associated type tags;
creating a query plan for the query by evaluating the candidate query fields and operands to identify subject fields, conditional parameters, any record count limit, and any explicit or implicit ordering criteria for the query, wherein evaluating the candidate query fields and operands comprises:
obtaining query parameters,
determining if any of the candidate query fields are subject fields,
matching the candidate query fields that are not subject fields to operands based on the query parameters, entity tags associated with the operands, and locations of the operands relative to candidate query fields, matching any operand not matched with a candidate query field to a default query field specified in the query parameters, and adding the matched candidate queries and operands to the query plan as conditional parameters for the query, wherein, in response to identifying implicit ordering criteria based on time, the computer system adapts ordering criteria based on the user's query to ensure results that have immediate time significance are placed ahead of less-immediate results; and creating, based on the query plan, a database query, wherein the database query is in a database query language.

7. The non-transitory computer-readable medium of claim 6, further comprising adding a record count limit and an ordering criteria to the query plan.

8. The non-transitory computer-readable medium of claim 6, wherein the system identifies any queryable field located between an interrogative or a lookup action entity and an entity corresponding to the database object as a subject field.

9. The non-transitory computer-readable medium of claim 6, wherein prior to determining if any of the candidate query fields are subject fields, the system preprocesses the candidate query fields and operands.

10. The non-transitory computer-readable medium of claim 9, wherein preprocessing the operands and query fields comprises removing any redundant, trivial, and subsumed query fields and operands from the candidate query fields and operands.

11. A computer system for creating a database query from a user's natural language query, the system comprising:

one or more processors;

one or more memory units coupled to the one or more processors, wherein the one or more memory units store instructions that, when executed by the one or more processors, cause the system to perform the operations of:

receiving a user's natural language query via a natural language interface to the system;

applying a natural language model to the user's query to identify an intent and a plurality of entities associated with the user's query, wherein the entities are tagged with an entity type and associated with a normalized value;

identifying a database object corresponding to the identified intent;

identifying candidate query fields and operands for the query based on the entities and associated type tags;

creating a query plan for the query by evaluating the candidate query fields and operands to identify subject fields, conditional parameters, any record count limit, and any explicit or implicit ordering criteria for the query, wherein evaluating the candidate query fields and operands comprises:

obtaining query parameters, determining if any of the candidate query fields are subject fields, matching the candidate query fields that are not subject fields to operands based on the query parameters, entity tags associated with the operands, and locations of the operands relative to candidate query fields, matching any operand not matched with a candidate query field to a default query field specified in the query parameters, and adding the matched candidate queries and operands to the query plan as conditional parameters for the query, wherein, in response to identifying implicit ordering criteria based on time, the computer system adapts ordering criteria based on the user's query to ensure results that have immediate time significance are placed ahead of less-immediate results; and creating, based on the query plan, a database query, wherein the database query is in a database query language.

12. The system of claim 11, further comprising adding a record count limit and ordering criteria to the query plan.

13. The system of claim 11, wherein the system identifies any queryable field located between an interrogative or a lookup action entity and an entity corresponding to the database object as a subject field.

14. The system of claim 11, wherein prior to determining if any of the candidate query fields are subject fields, the system preprocesses the query fields and operands.

15. The system of claim 14, wherein preprocessing the operands and query fields comprises removing any redundant, trivial, and subsumed query fields and operands from the candidate query fields and operands.

* * * * *